United States Patent [19]

Bramer

[11] 4,440,039

[45] Apr. 3, 1984

[54] REMOTE CONTROL MIRROR

[75] Inventor: Charles Bramer, North Shores, Mich.

[73] Assignee: Lacks Industries, Inc., Grand Rapids, Mich.

[21] Appl. No.: 290,979

[22] Filed: Aug. 7, 1981

[51] Int. Cl.³ .............................................. F16C 1/10
[52] U.S. Cl. ................................................ 74/501 M
[58] Field of Search ............ 74/501 M; 248/479, 596, 248/580

[56] References Cited

U.S. PATENT DOCUMENTS

| | | | |
|---|---|---|---|
| 3,411,372 | 11/1968 | Skillin | 74/501 M |
| 3,545,290 | 12/1970 | McCord et al. | 74/501 M |
| 4,281,815 | 8/1981 | O'Connell et al. | 248/479 |
| 4,306,701 | 12/1981 | Nierhaus et al. | 248/479 |

FOREIGN PATENT DOCUMENTS

| | | | |
|---|---|---|---|
| 963362 | 2/1975 | Canada | 74/501 M |
| 2601308 | 7/1976 | Fed. Rep. of Germany | 74/501 M |

Primary Examiner—Leslie A. Braun
Attorney, Agent, or Firm—Dale A. Winnie

[57] ABSTRACT

A West coast style mirror for vehicles and which includes a housing having a mirror supporting member mounted therein and which is pivotal about a relatively fixed axis, a mirror member mounted on the supporting member for movement about a second relatively fixed axis, a pinion gear mounted on the supporting member, a gear segment provided on the back of the mirror member and engaged with the pinion gear, and remote control cable means adapted by rotational movement to turn the pinion gear and by push-pull actuation to move the mirror supporting member, on which the pinion gear is mounted, for selective adjustment of the viewing angle of the mirror member.

6 Claims, 9 Drawing Figures

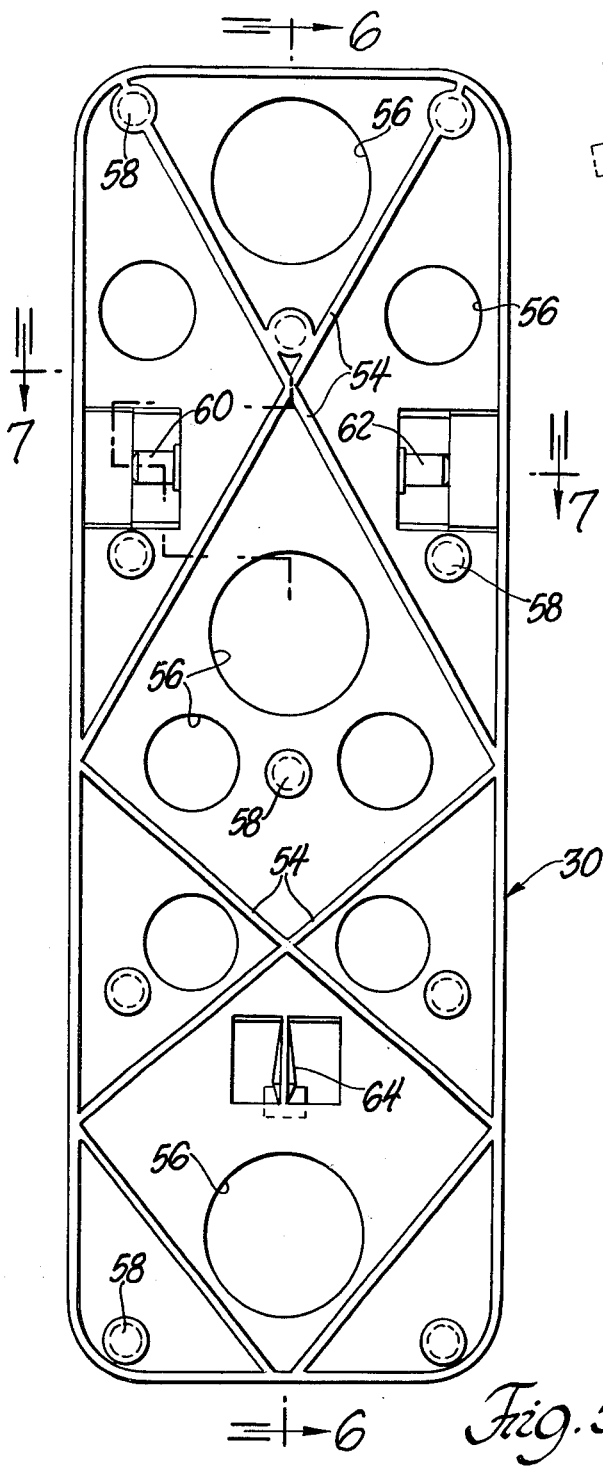
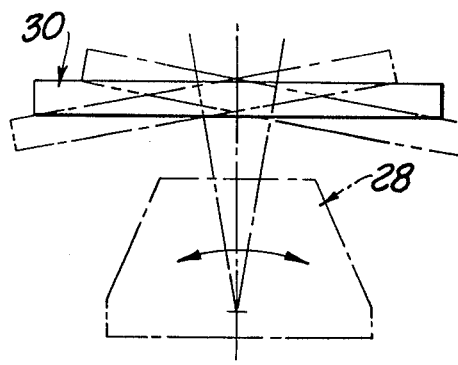
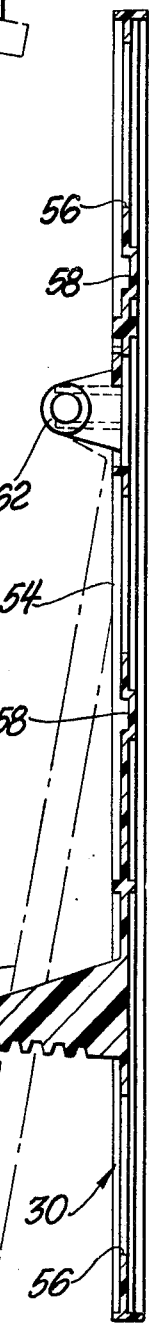
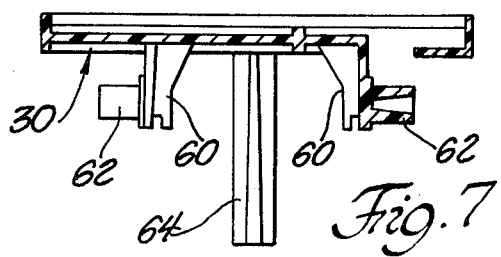
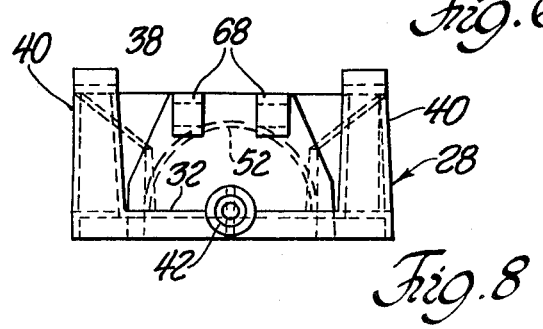

REMOTE CONTROL MIRROR

BACKGROUND OF THE INVENTION

West coast style rear view mirrors are the large rear view mirrors that are used on large trucks, vans, motor homes, and the like and are mounted on arms that extend out to hold the mirror some distance from the vehicle cab so that the driver has a better line of vision down the length of his vehicle and behind it.

These mirrors are usually manually adjustable, rather than by any remote control means, as has become more common and generally known with passenger car rear view mirrors.

They are large mirrors, because they have to be disposed a distance out and away from the driver, and consequently, they are more prone to road vibration and wind than the smaller passenger car mirrors. This, in turn, usually dictates a more stable and stiffer means of pivotal support than can be used with the passenger car mirrors.

While the smaller rear view mirrors can use a ball and socket type pivotal support, with flexible wire control cable connections, to afford remote control, the larger mirror functions better with a transverse axis type of universal joint support which provides greater stability and with added stiffness provided by greater frictional resistance in their pivotal connections. However, as mentioned, this is not condusive to remote control operation with the more commonly known remote control operating means.

Usually, some form of hydraulic or motor driven actuator has been used with the large truck mirrors, where size and massive appearance is not too objectionable.

What appears to be needed is a new or modified construction for these large mirrors, which will have all the advantages presently known, particularly as regards size and arm mounting, but which will provide a mirror that turns easier and is more easily adjusted for better control and operation by remote means in the vehicle cab. And further, that will enable a more simple and less expensive type of remote control operating means to be used with these mirrors and not add too appreciably to their cost of manufacture and ultimate retail expense.

SUMMARY OF THE PRESENT INVENTION

This invention relates to a west coast type mirror for larger vehicles and to a mirror which is and can be made much lighter in weight than other mirrors of like size, is much easier to adjust and operate than similarly known mirrors of such size, has added wind and road vibration resistance by having greater stability in the way it is pivotally mounted and which is smoothly and easily operated and controlled by a simple remote control operating mechanism.

The reduction in the weight to size ratio in the present mirror is obtained by using a polyurethane or other high impact plastic, rather than die castings, to provide not only the mirror case, but its supporting mechanism and the functional parts of its operating mechanism.

The use of such material will also be appreciated as affording pivotal connections which have less frictional resistance and provide a mirror that will turn easier and respond better and more smoothly to remote control operating means.

Transverse pivotal axes are still used to provide the universal joint type of pivotal support, but an added improvement feature is in the use of a broader base or stablizing part, on the mirror supporting member, which helps reduce and eliminate the adverse effects of wind and road vibrations.

The control means for the mirror is of the single wire push-pull and rotatable type. The single wire operator is adapted to rotationally turn a small pinion gear that is engaged with a gear segment on the back of the mirror case to cause the adjustment of the viewing angle about a given axis. At the same time, the small gear is mounted on the member which carries and supports the mirror and which member is itself pivotal about another axis. Accordingly, push-pull actuation of the single wire control that turns the small pinion gear will also effect rotational movement of the mirror supporting member and thereby enable adjustment of the viewing angle of the mirror about a second axis and afford universal adjustment and control therefor.

These and other objects and advantages in the practice of this invention will be better known and understood upon a reading of the detailed description of the illustrated embodiment of this invention, as shown by the accompanying drawings, which follow hereinafter.

IN THE DRAWING FIGURES

FIG. 5 is a front elevational view of the mirror case, without the reflective mirror normally provided thereon, to show the relative location of its carrier arms and the gear segment by which it is operated.

FIG. 6 is a cross-section view of the mirror case as seen in the plane of line 6—6 in the previous drawing figure and looking in the direction of the arrows.

FIG. 7 is a cross-sectional view of the mirror case as seen in the plane of line 7—7 in FIG. 5, and looking in the direction of the arrows.

FIG. 8 is a top plan view of the mirror case supporting member showing the base pad at the other end thereof in dotted outline therethrough.

FIG. 9 shows the straight, right and left positions of the mirror member as its viewing angle is adjusted by movement of the supporting member about its pivotal axis.

DETAILED DESCRIPTION

Figure 1:
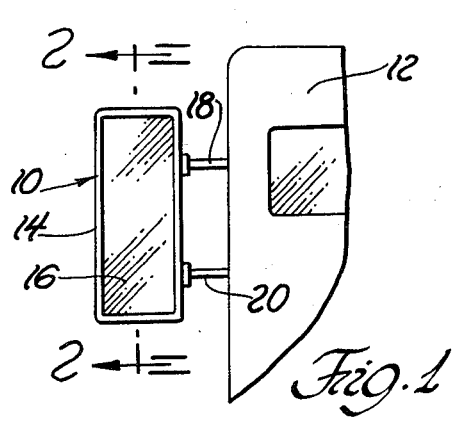
FIG. 1 is a side view of the west coast style rear view mirror of this invention shown as mounted on the cab of a vehicle just outside the driver's compartment.

The remote control west coast style rear view mirror of this invention is shown in the first drawing figure, and identified by the numeral 10, as mounted upon the side of a vehicle 12 just outside of the drivers compartment.

It includes an outer housing or shell 14 within which is supported and provided a mirror member 16 and it has a pair of arms 18 and 20 that connect it it to the side wall of the vehicle. One of these suppporting arms is hollow to allow a flexible cable to be threaded there through for operating the rear view mirror, to adjust its viewing angle, by a control knob within the vehicle, as will be described subsequently in further detail.

As shown in the second drawing figure, the outer housing or shell 14 has a wind deflective shape 22, a large opening 24 which is disposed rearwardly, and an enclosed space 26 that is behind the mirror member mounted in the opening.

Within the space 26, inside the housing, is a mirror supporting member 28 that is mounted on supports provided on the back wall (front facing wall) of the housing member. And a mirror case 30 is mounted on the supporting member and it, in turn, has the reflective mirror member 16 mounted on it and disposed to face outwardly and rearwardly.

The mirror supporting member 28 includes a relatively thin light weight back wall part 32 which is reinforced by structual ribs 34 that extend diagonally there across and side walls 36 that extend outwardly therefrom between a base part 38 and a pair of arms 40 at its upper end. Pivot pins 42 and 44 are provided on the back wall part and are in line over and under it to serve as the axis about which the supporting member is pivotal within the housing 14.

A bearing and support 46 is provided on the back wall of the housing part, down low, to receive and support the base part 38 of the mirror supporting member 28 and to receive the pivot pin 44 in journaled engagement therewithin. At the other end, in the housing part 14, up higher, is provided a back wall part 48 that is receptive of the other pivot pin 42 in journaled engagement therewith and to support the mirror supporting member for pivotal movement about a vertical axis through the two pivot pins.

Figure 4:
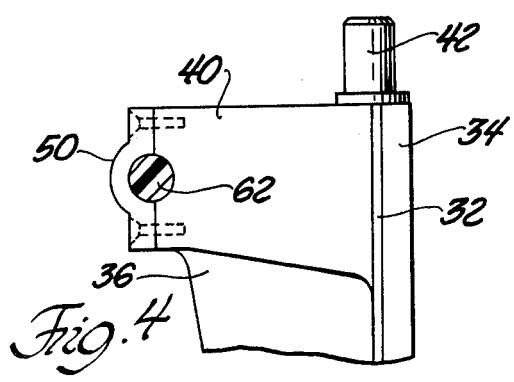
FIG. 4 is a further enlarged view of the upper disposed arms on the mirror supportive member through which is provided the horizontal axis that is used in adjusting the viewing angle of the mirror member.

The actual bearing surface, in the support 48, is closed by a separate cap or cover member 50, similar to the one shown in FIG. 4. This enables the base part 38 and its pivot pin 44 to be positioned first, on the lower support 46, and for the bearing cap or cover member 50 to hold them squarely and tightly seated on the lower support when it is fastened down. This, in turn, allows for a freer turning looser fit of the pivot pins in their respective parts while still obtaining a relatively stable and less vibration prone mounting for the mirror supporting member within the housing part.

To further enhance the structure, in obtaining these benefits, a Teflon O-ring 52 is provided within receptive grooves in the support part 46 and base part 38. And, as a consequence, any vibrational effects that might otherwise be transmitted through the support, from the housing to the mirror supporting member, will be damped out and eliminated.

Referring now to the mirror case 30, it includes a relatively thin flat walled part with cross ribs 54 for strengthening, holes 56 to lighten its weight and pads 58 on which the reflective mirror member itself is adhered. Near the upper end, a pair of pivot pins 60 are provided on arms 62 that are formed outwardly and extended rearwardly. They are also relatively aligned to provide a pivotal axis for movement of the mirror case on the mirror supporting member. Down lower on the mirror case and extending out rearwardly is a gear segment 64 with the gear teeth formed on the underside thereof and, on an arc struck from the pivotal axis provided by pins 62.

Figure 3:
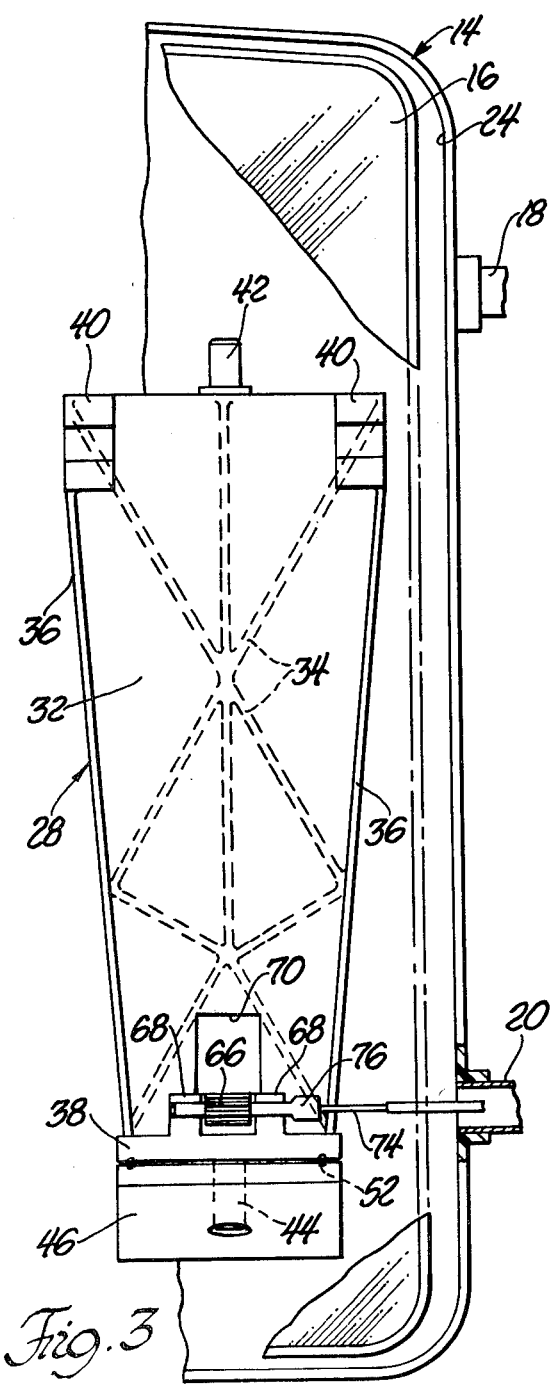
FIG. 3 is a similarly enlarged front elevational view of the mirror structure with the reflective mirror part cut away to show the mirror supporting and operating parts within the housing shell.
Figure 2:
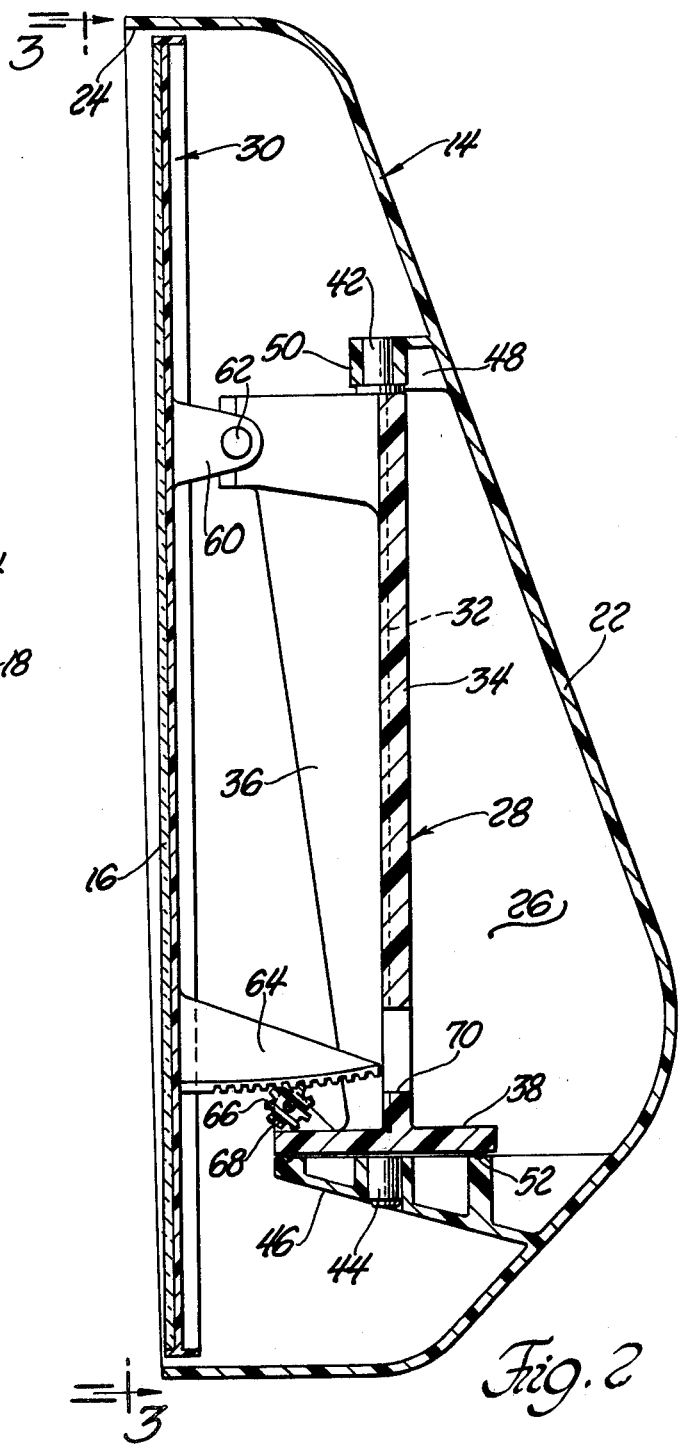
FIG. 2 is an enlarged cross-sectional view of the mirror as seen in the plane of line 2—2 in the previous drawing figure and looking in the direction of the arrows.

Referring back to FIGS. 2 and 3, a small spur or pinion gear 66 is shown mounted on the base part 38 of the mirror supporting member and disposed for engagement with the gear segment on the mirror case. The gear is mounted between a couple of supports 68 near the edge of the base part and a spaced distance from the turning axis of the mirror supporting member. It is also located in front of an opening 70 provided in the back wall of the mirror supporting member and through which the gear segment 64 can be extended in tilting the mirror case in a downwardly reflective direction.

As best seen in FIGS. 7 and 8, looking down on the mirror case 30 and the mirror supporting member 28, which are shown relatively spaced but as disposed for engagement in the two figures taken together, the pivot pins 62 on the mirror case are formed on its backside and are disposed to be received and held on the protruding arms 40 at the upper end of the mirror supporting member. And, in holding the pivot pins 62 journaled on the arms 40, as by the bearing caps or covers 50, this also serves to hold the gear segment 64 in tightly fitted engagement with the pinion gear 66 (as mounted on the supporting member) again in a manner which helps to avoid and eliminate adverse vibrational effects from being transmitted or set up therebetween.

The pinion gear 66, as mounted on the mirror supporting member, is rotatable and may be caused to rotate by means of a single wire control cable 74 which is connected and crimped to a fitting 76 on the end of the pinion gear shaft. Furthermore, the pinion gear 66 is pivotal with the mirror supporting member 28, about the vertical axis provided for the mirror supporting member, by extending or retracting the wire control cable relatively within its sheath, fixed as within the mirror support arm 20 in the manner of conventionally known push-pull wire controls.

As shown by FIG. 9, the mirror case 30 and its reflective mirror member may be turned to the right or the left by causing the whole supporting member 28 to turn to the right or the left. And, separately, or simultaneously, the mirror case and its reflective mirror member may also be pivoted, as shown by FIG. 6, and caused to tilt forward or back on the mirror supporting member. And as a consequence, the reflective angle for the mirror member is variable about both a vertical and a horizontal axis and is afforded free universal movement.

I claim:

1. A remote control rear view mirror for vehicle use and comprising;
    a housing having a mirror member and its operating mechanism mounted therewithin and means for mounting the housing itself externally on a vehicle,
    control means adapted to be mounted within the vehicle and including cable means responsive to push-pull and rotary movement for operative control of the mirror member mounted within the housing,
    a mirror supporting member provided in said housing as part of said operating mechanism and having the mirror member mounted thereon and pivotal about a relatively fixed horizontal axis for vertical viewing adjustment,
    means for mounting said supporting member within said housing and for pivotal movement about a relatively fixed vertical axis to obtain lateral viewing adjustment of the mirror member, a small pinion gear and means for mounting said pinion gear on said mirror supporting member at a location relatively spaced from one of said vertical and horizontal axes that afford viewing adjustment for the mirror member and to turn about an axis relatively spaced from the other of said viewing adjustment axes, a gear toothed arcuate segment provided on the back side of the mirror member and projecting outwardly and normal thereto, said gear segment being formed and disposed for operative engagement with said pinion gear, and said cable means including a sheathed cable operatively connected to said pinion gear for turning it to effect adjustment of the mirror member about one of said axes via said gear segment and for exerting axial force thereon to effect rotational movement of the supporting member and thereby adjustment of the mirror member mounted thereon about the other of said axes.

2. The remote control mirror of claim 1, including means for damping and minimizing road and other vibrations provided between said housing and said mirror supporting member.

3. The remote control mirror of claim 2, said last mentioned means including a load bearing base provided on said mirror supporting member, a receptive supporting surface provided in said housing and vibration damping means provided between said base and supporting surface.

4. The remote control mirror of claim 1, said mirror supporting member having the horizontal axis about which the mirror member is pivotal provided near the upper disposed end thereof, having the pinion gear mounted and disposed near the lower disposed end thereof and having the gear segment received therebetween and positioned for closely held meshing engagement with said gear member.

5. The remote control mirror of claim 1, said mirror supporting member having an opening provided therein which is formed and disposed to receive the end of the gear segment on the back of the mirror member therethrough in the course of mirror member movement towards it.

6. The remote control mirror of claim 5, said opening being spaced relatively distant from the axis about which said mirror member is pivotal on said mirror supporting member and thereby allowing said gear segment to be more remotely spaced from said axis and to afford greater anti-vibrational stability in the mirror actuating use thereof.

* * * * *